US010293677B2

(12) United States Patent
Harris

(10) Patent No.: US 10,293,677 B2
(45) Date of Patent: May 21, 2019

(54) HEAT EXCHANGER AND STRUCTURE FOR MOUNTING EXTERNAL COMPONENT TO HEAT EXCHANGER

(71) Applicant: DENSO International America, Inc., Southfield, MI (US)

(72) Inventor: Justin Nathaniel Harris, Royal Oak, MI (US)

(73) Assignee: DENSO International America, Inc., Southfield, MI (US)

(*) Notice: Subject to any disclaimer, the term of this patent is extended or adjusted under 35 U.S.C. 154(b) by 219 days.

(21) Appl. No.: 15/270,413

(22) Filed: Sep. 20, 2016

(65) Prior Publication Data

US 2018/0080724 A1 Mar. 22, 2018

(51) Int. Cl.

*F16B 37/04* (2006.01)
*B60K 11/04* (2006.01)
*F28F 21/06* (2006.01)
*F28F 9/00* (2006.01)

(52) U.S. Cl.

CPC .............. *B60K 11/04* (2013.01); *F16B 37/04* (2013.01); *F28F 9/002* (2013.01); *F28F 21/06* (2013.01); *F28F 2275/20* (2013.01)

(58) Field of Classification Search

CPC ....... F16B 37/044; F16B 37/045; F16B 37/04
USPC ................................. 411/103, 104, 111–113
See application file for complete search history.

(56) References Cited

U.S. PATENT DOCUMENTS

| | | | | |
|---|---|---|---|---|
| 4,875,816 A * | 10/1989 | Peterson | F16B 37/043 | 411/104 |
| 5,022,804 A * | 6/1991 | Peterson | F16B 37/044 | 403/21 |
| 5,139,080 A | 9/1992 | Bolton et al. | | |
| 5,193,643 A * | 3/1993 | McIntyre | B60G 99/00 | 180/312 |
| 6,854,941 B2 * | 2/2005 | Csik | F16B 37/044 | 411/111 |
| 7,036,561 B2 * | 5/2006 | Yagi | F28D 1/0435 | 165/140 |
| 9,091,468 B2 | 7/2015 | Colpan et al. | | |
| 9,233,459 B2 * | 1/2016 | Olson | B25B 31/00 | |
| 9,435,369 B2 * | 9/2016 | Deck | F16B 39/24 | |
| 2006/0078400 A1 * | 4/2006 | Van Walraven | B25B 13/02 | 411/103 |
| 2015/0369273 A1 * | 12/2015 | Saitou | F16B 37/044 | 411/173 |

FOREIGN PATENT DOCUMENTS

| | | |
|---|---|---|
| CN | 203404212 U | 1/2014 |
| JP | 2009-139038 A2 | 6/2009 |

* cited by examiner

*Primary Examiner* — Roberta S Delisle

(57) ABSTRACT

The present disclosure provides a heat exchanger including a holder and a nut. The holder defines a holding space therein. The nut includes a main body, which is inserted into the holding space along an insertion direction, and a protrusion, which protrudes from the main body. The nut defines a threaded hole that extends through the main body and the protrusion. The holder further defines an opening at a first surface of the holder. The protrusion has an end surface that aligns with or protrudes from the first surface through the opening when the nut is inserted into the holding space. The end surface contacts an external component when the external component is fixed to the heat exchanger by inserting a bolt into the threaded hole through the external component.

14 Claims, 5 Drawing Sheets

HEAT EXCHANGER AND STRUCTURE FOR MOUNTING EXTERNAL COMPONENT TO HEAT EXCHANGER

TECHNICAL FIELD

The present disclosure relates to a heat exchanger and a structure for mounting an external component to the heat exchanger.

BACKGROUND

Conventionally, engine cooling module (ECM) components such as electric fans/shrouds are fastened to a heat exchanger such as a radiator through a bolt-nut combination. The heat exchanger typically has an attachment portion formed in, for example, a tank, and a nut is set inside a space defined in the attachment portion. Then, the ECM component is fixed to the attachment portion by screwing the bolt into the threaded hole of the nut.

However, there has been following concern in such a conventional structure for mounting the ECM component to the heat exchanger. Typically, the ECM component has a receiving surface with a metal insert, whereas the attachment portion of the heat exchanger (the tank) is formed of a plastic material. When the ECM component is fixed to the attachment portion of the heat exchanger, the attachment portion contacts the ECM component, and therefore a fastening force by the bolt acts on the attachment portion of the heat exchanger from the metal insert of the ECM component. In other words, the conventional structure provides a plastic bearing surface in the heat exchanger to receive the ECM component. As a result, due to vibration and/or high temperature during operation of the heat exchanger, plastic creep may generate in the attachment portion, which could lead to bolt loosening.

In view of the above, it is an objective to provide a heat exchanger and a structure that provide a metal bearing surface for fixing an extra component to the heat exchanger.

SUMMARY

This section provides a general summary of the disclosure, and is not a comprehensive disclosure of its full scope or all of its features.

In a first aspect of the present disclosure, a heat exchanger includes a holder and a nut. The holder defines a holding space therein. The nut includes a main body, which is inserted into the holding space along an insertion direction, and a protrusion, which protrudes from the main body. The nut defines a threaded hole that extends through the main body and the protrusion. The holder further defines an opening at a first surface of the holder. The protrusion has an end surface that aligns with or protrudes from the first surface through the opening when the nut is inserted into the holding space. The end surface contacts an external component when the external component is fixed to the heat exchanger by inserting a bolt into the threaded hole through the external component.

In a second aspect of the present disclosure, a structure for mounting an external component to a heat exchanger includes a holder, a nut, a fixing portion, a bolt. The holder is disposed in the heat exchanger and defines a holding space. The nut includes a main body, which is inserted into the holding space along an insertion direction, and a protrusion, which protrudes from the main body. The fixing portion is disposed in the external component and defines a through hole. The nut defines a threaded hole that extends through the main body and the protrusion. The holder further defines an opening that is open at a first surface of the holder. The protrusion has a first end surface that aligns with or protrudes from the first surface through the opening when the nut is inserted into the holding space. The fixing portion has a second end surface that contacts the first end surface when the external component is fixed to the heat exchanger by inserting the bolt into the threaded hole through the through hole.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure. In the drawings.

DETAILED DESCRIPTION

Figure 1:
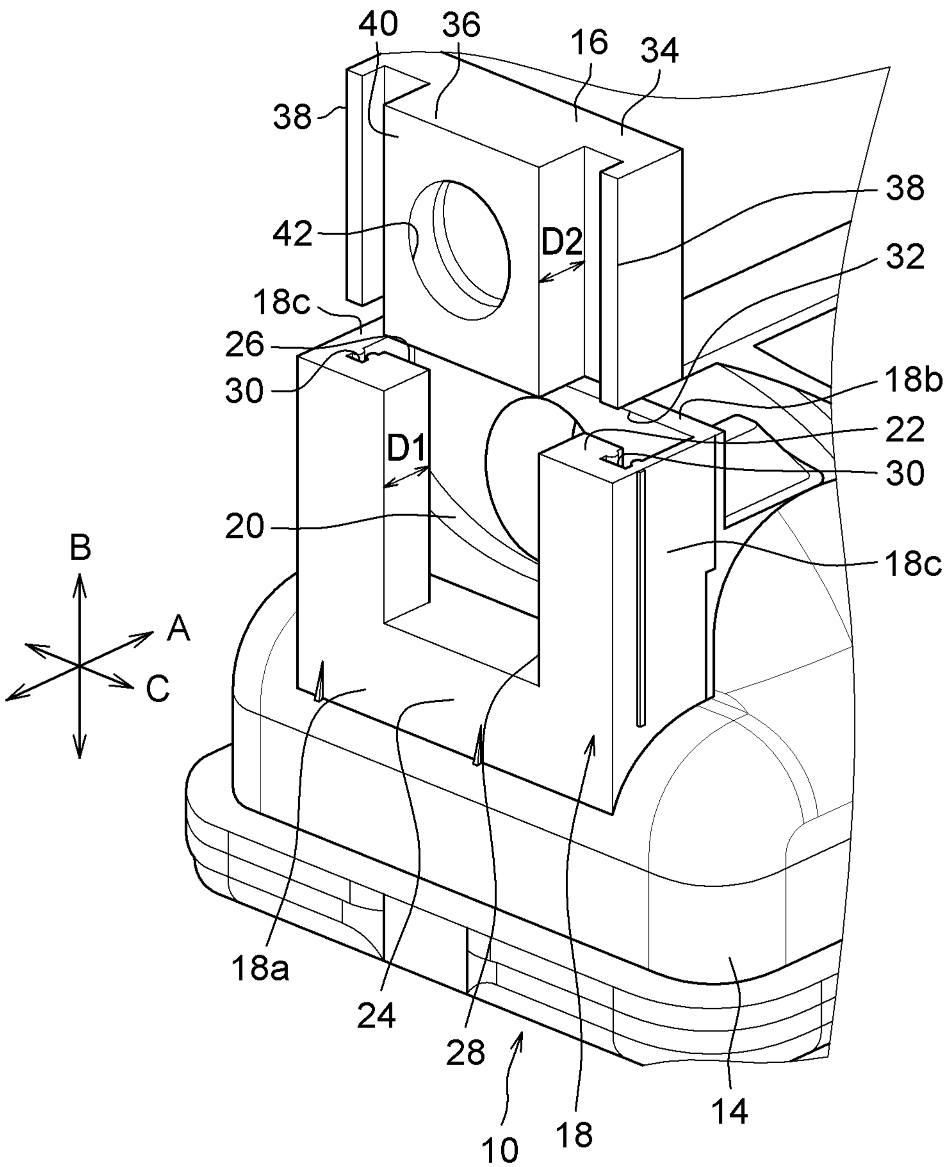
FIG. 1 is a perspective view of a radiator and a nut before the nut is separated from a holder according to a first embodiment.

As follows, a plurality of embodiments of the present disclosure will be described with reference to drawings. It will be apparent to those skilled in the art from this disclosure that the following descriptions of the embodiments are provided for illustration only and not for the purpose of limiting the invention as defined by the appended claims and their equivalents. In the embodiments, a part that corresponds to a matter described in a preceding embodiment may be assigned with the same reference numeral, and redundant explanation for the part may be omitted. When only a part of a configuration is described in an embodiment, another preceding embodiment may be applied to the other parts of the configuration. The parts may be combined even if it is not explicitly described that the parts may be combined. The embodiments may be partially combined even if it is not explicitly described that the embodiments may be combined, provided there is no harm in the combination.

In the following embodiments, an ECM component (Engine Cooling Module component) as an external component is fixed to a radiator as a heat exchanger through a nut-bolt combination. The ECM component can be, for example, an electric fan/shroud, a condenser, an ATOC (Air-To-Oil Cooler), a mounting bracket, or the like. More specifically, a mounting bracket is fixed to the radiator in the following embodiments.

First Embodiment

The radiator 10 and the structure for mounting the mounting bracket (external component) 12 to the radiator 10 according to the first embodiment will be described. FIG. 1 is a perspective view illustrating a portion of a tank 14 of the radiator 10 and a nut 16. The tank 14 is formed of a plastic and has an elongated shape extending along a direction A as shown in FIG. 1. A holder 18 to hold the nut 16 is formed in one of side ends of the tank 14. The holder 18 has a substantially quadrangular prism shape and protrudes from a top surface of the tank 14 in a direction B (insertion direction). In the present embodiment, the direction B is substantially perpendicular to the direction A.

The holder 18 includes an outer wall 18*a*, an inner wall 18*b*, and two side walls 18*c*. The outer wall 18*a* and the inner wall 18*b* are separated away from each other and face each other in the direction A. The outer wall 18*a* and the inner wall 18*b* are connected to each other at both sides through the two side walls 18*c*. The outer wall 18*a*, the inner wall 18*b*, and the two side walls 18*c* define a holding space 20 inside the holder 18. Furthermore, each end surface of the outer wall 18*a*, the inner wall 18*b*, and the two side walls 18*c* form a top surface 22 (second surface) of the holder 18.

The outer wall 18*a* has a flat outer surface (first surface) 24 and a flat inner surface 26, and a window (opening) 28 is defined in the outer wall 18*a*. The window 28 is formed by, e.g., cutting the outer wall 18*a* from the top surface 22. The window 28 is open in the direction A at the outer wall 18*a* and open in the direction B at the top surface 22. The window 28 has a rectangular shape when viewed along the direction A and is in communication with the holding space 20. As shown in FIG. 1, the thickness of the outer wall 18*a* along the direction A (i.e., the distance between the flat outer surface 24 and the flat inner surface 26) is defined as a thickness D1.

The outer wall 18*a* further includes two groove elements (guiding groove) 30 as a first guide. Each of the two groove elements 30 is recessed from the flat inner surface 26 of the outer wall 18*a* and extends along the direction B as shown in FIG. 1. The two groove elements 30 are arranged on both sides of the window 28.

The top surface 22 defines an attachment opening 32 that is open in the direction B as shown in FIG. 1. The attachment opening 32 is in communication with the holding space 20. Through the attachment opening 32, the nut 16 is inserted into and removed from the holding space 20.

The nut 16 is formed of metal and includes a main body 34 and a protrusion 36. The main body 34 has a substantially quadrangular prism shape elongated along a direction C as shown in FIG. 1. In the present embodiment, the direction C is perpendicular to both the directions A and B. The main body 34 includes an outer flat surface that faces the flat inner surface 26 of the outer wall 18*a* of the holder 18 and an inner flat surface that is opposite to the inner flat surface of the main body 34 in the direction A. The main body 34 includes side ends that are opposite to each other in the direction C. The main body 34 further includes two protruding elements 38 (guiding protrusion) at both the side ends as shown in FIG. 1. Each of the protruding elements 38 protrudes from the outer flat surface of the main body 34 and extends along the direction B. Each protruding element 38 is configured to be inserted into the corresponding groove element 30. The width of the protruding element 38 along the direction C is substantially the same as the width of the groove element 30 along the direction C. Therefore, the protruding element 38 engages with the groove element 30 when the protruding element 38 is inserted into the groove element 30.

The protrusion 36 of the nut 16 has a substantially quadrangular prism shape. The protrusion 36 protrudes from the outer flat surface of the main body 34 in the direction A. In the present embodiment, the amount of protrusion of the protrusion 36 from the main body 34 (i.e., the thickness D2 of the protrusion 36 along the direction A, see FIG. 1) is set to be substantially the same as the thickness D1 of the outer wall 18*a* of the holder 18.

The protrusion 36 has an end surface (first end surface) 40 that has a flat rectangular shape. The shape of the end surface 40 is substantially the same as the shape of the window 28. As described below, the protrusion 36 is fit in the window 28 when the nut 16 is inserted into the holding space 20. Furthermore, the end surface 40 is substantially aligns with the flat outer surface 24 of the outer wall 18*a* through the window 28 when the nut 16 is inserted into the holding space 20.

The nut 16 defines a threaded hole 42 that is open in the direction A (insertion direction) through both the main body 34 and the protrusion 36. The threaded hole 42 is positioned at the center of the protrusion 36.

Figure 2:
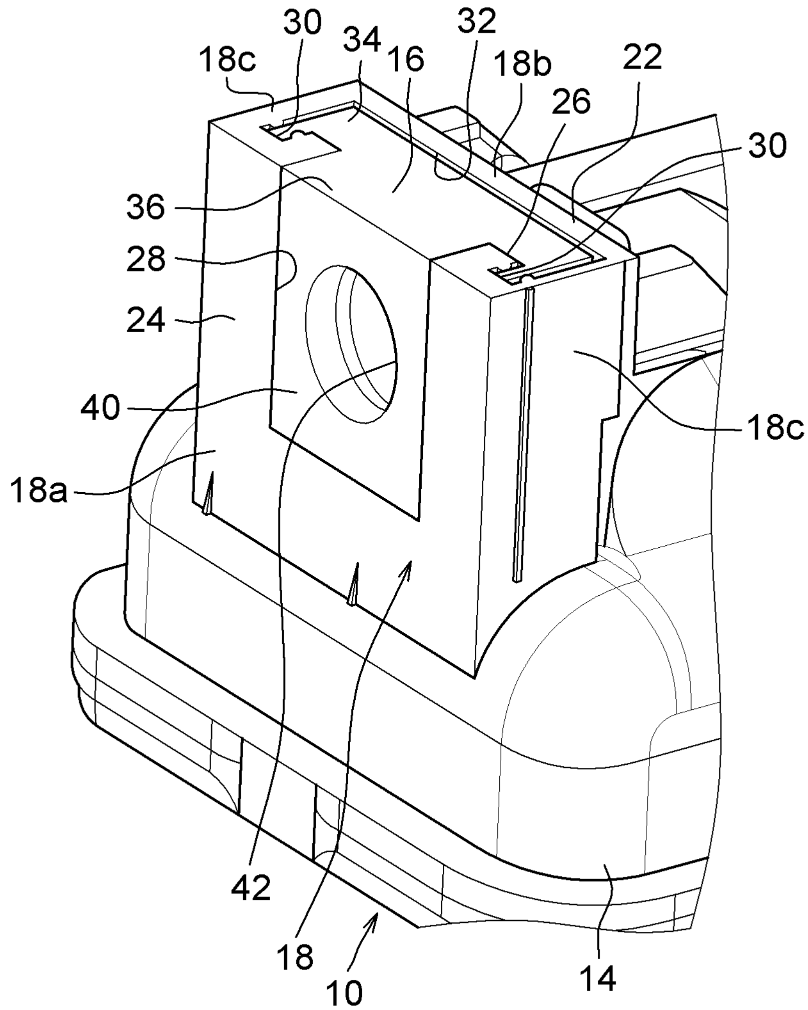
FIG. 2 is a perspective view of the radiator and the nut after the nut is inserted into the holder.
Figure 3:
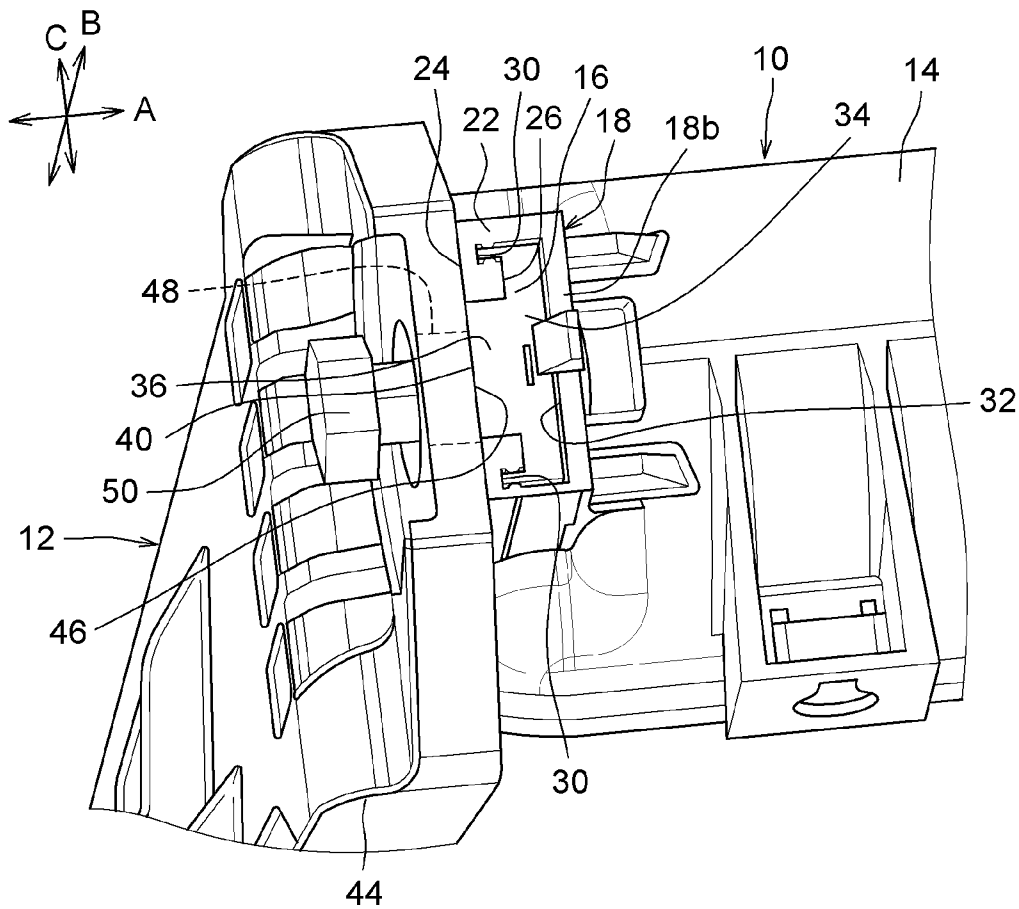
FIG. 3 is a perspective view of the radiator and a mounting bracket fixed to the radiator.

As partially shown in FIG. 3, the mounting bracket 12 has a rectangular shape elongated in the direction B. The mounting bracket 12 has two ends that are opposite to each other in the direction B. In the present embodiment, a fixing portion 44 is disposed in the upper one end. The fixing portion 44 is fixed to the tank 14. The fixing portion 44 includes a contact surface (second end surface) 46 that faces the tank 14 when the mounting bracket 12 is fixed to the tank 14. The contact surface 46 is a flat surface having a rectangular shape. Although, the fixing portion 44 is mainly formed of plastic, the contact surface 46 includes a metal insert (not shown) that provides a metallic surface to be in contact with the nut 16. As shown by the dashed line in FIG. 2, the fixing portion 44 defines a through hole 48 that is open in the direction A. When the mounting bracket 12 is fixed to the radiator 10 (the tank 14), a bolt 50 is inserted into the through hole 48 from a surface of the fixing portion 44 opposite to the contact surface 46 in the direction A, and then the bolt 50 is fastened into the threaded hole 42.

Next, the process of mounting the mounting bracket 12 to the radiator 10 will be described below. Initially, the nut 16 is inserted into the holding space 20 of the holder 18. At this point, the two protruding elements 38 are inserted into the two groove elements 30, respectively. Then, each of the protruding elements 38 slides along the corresponding groove element 30, whereby the nut 16 is guided by the sliding of the protruding element 38 along the groove element 30. When the protruding elements 38 are inserted into the groove elements 30, the protruding elements 38 and the groove elements 30 engage with each other. Due to this engagement, the nut 16 is prohibited from falling out from the holder 18.

In the present embodiment, the inner shape of the holding space 20 is formed to substantially match the outer shape of the nut 16. Therefore, when the nut 16 is set in the holding space 20, the nut 16 is housed inside the holding space 20 with being fit in the holding space 20. As shown in FIG. 2, the protrusion 36 of the nut 16 is also fit in the window 28 when the nut 16 is inserted in the holding space 20, and the end surface 40 of the nut 16 is exposed to an outside of the holder 18 through the window 28. As described above, the thickness D2 of the protrusion 36 is substantially equal to the thickness D1 of the outer wall 18*a* of the holder 18. Thus, the end surface 40 of the protrusion 36 aligns with the flat outer surface 24 of the holder 18, as shown in FIG. 2. In other words, the end surface 40 and the flat outer surface 24 form a common flat surface.

Next, the mounting bracket 12 is set so that the through hole 48 aligns with the threaded hole 42 along the direction A. Then, the bolt 50 is inserted into the threaded hole 42 through the through hole 48, and is fastened against the nut 16. When the bolt 50 is inserted into the threaded hole 42, the contact surface 46 is brought into contact with the end surface 40 of the nut 16, as shown in FIG. 3. Thus, the fastening force by the bolt 50 is received by the end surface 40 of the nut 16 which is made of metal. In other words, the end surface 40 of the nut 16 serves a metal bearing surface for receiving the mounting bracket 12, which is made of metal. Therefore, mechanically firm connection between the mounting bracket 12 and the radiator 10 can be achieved according to the present embodiment.

If the end surface 40 of the nut 16 is positioned an inner side of the holding space 20 as compared to the flat outer surface 24 of the holder 18, and if only the flat outer surface 24 of the holder 18 receives the contact surface 46 of the mounting bracket 12, plastic creep would likely generate on the flat outer surface 24 of the holder 18 due to vibration or high temperature during operation of the radiator 10. Such plastic creep would cause the bolt 50 to loosen. However, due to the metal bearing structure where the end surface 40 substantially receives the fastening force, generation of plastic creep on the flat outer surface 24 of the holder 18 is prohibited, whereby occurrence of bolt loosening can be avoided. In addition, because the metal bearing structure is provided by the nut 16, there is no need to form a molded insert in the holder 18.

Second Embodiment

Figure 4:
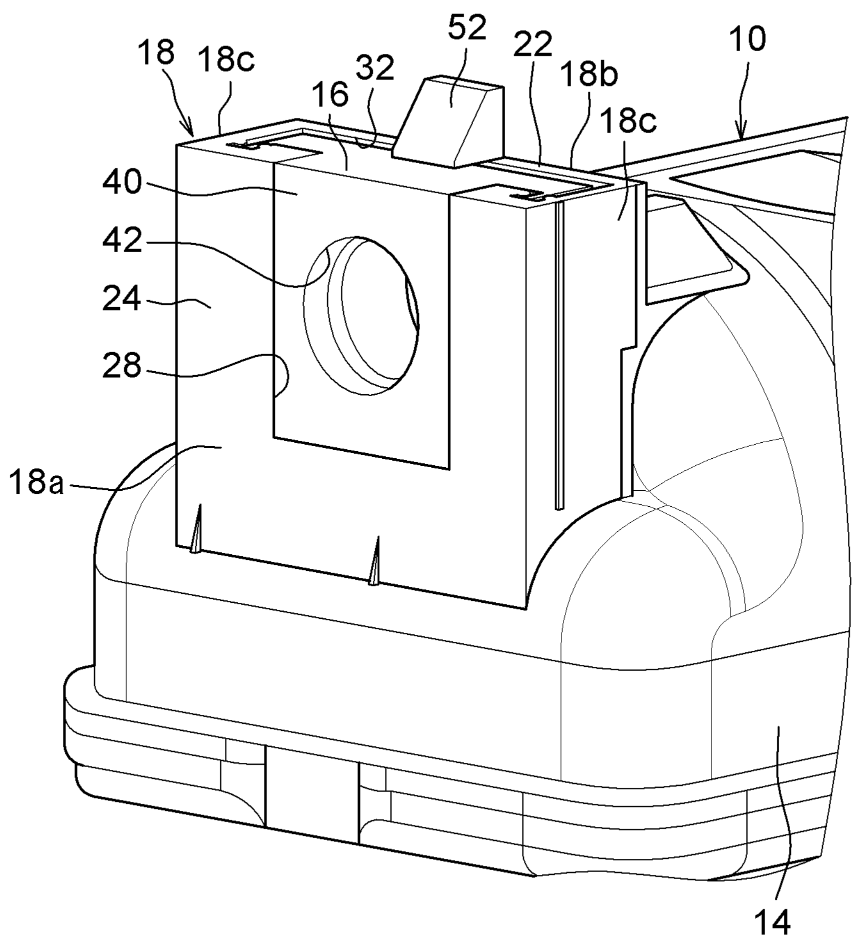
FIG. 4 is a perspective view of a radiator and a nut inserted into a holder according to a second embodiment.

Next, the radiator 10 and the structure for mounting the mounting bracket 12 to the radiator 10 according the second embodiment will be described with reference to FIG. 4. In the present embodiment, the holder 18 further includes a locking portion 52. The locking portion 52 is formed on the top surface 22 of the holder 18 such that the locking portion 52 protrudes upward from the top surface 22. The locking portion 52 is made of a plastic material to be elastically deformable. The locking portion 52 protrudes from the inner wall **18*b* toward the outer wall 18*a* of the holder 18**.

When the nut 16 is inserted into the holding space 20, the locking portion 52 is elastically deformed by a technician not to interfere with the insertion of the nut 16 into the holding space 20. After the nut 16 was inserted into the holding space 20, the technician releases the pressure to the rocking portion, and the locking portion 52 elastically returns to the original shape of the locking portion 52. When the locking portion 52 returns to the original shape, the locking portion 52 engages with the nut 16, whereby the nut 16 can be stably held inside the holding space 20.

Third Embodiment

Figure 5:
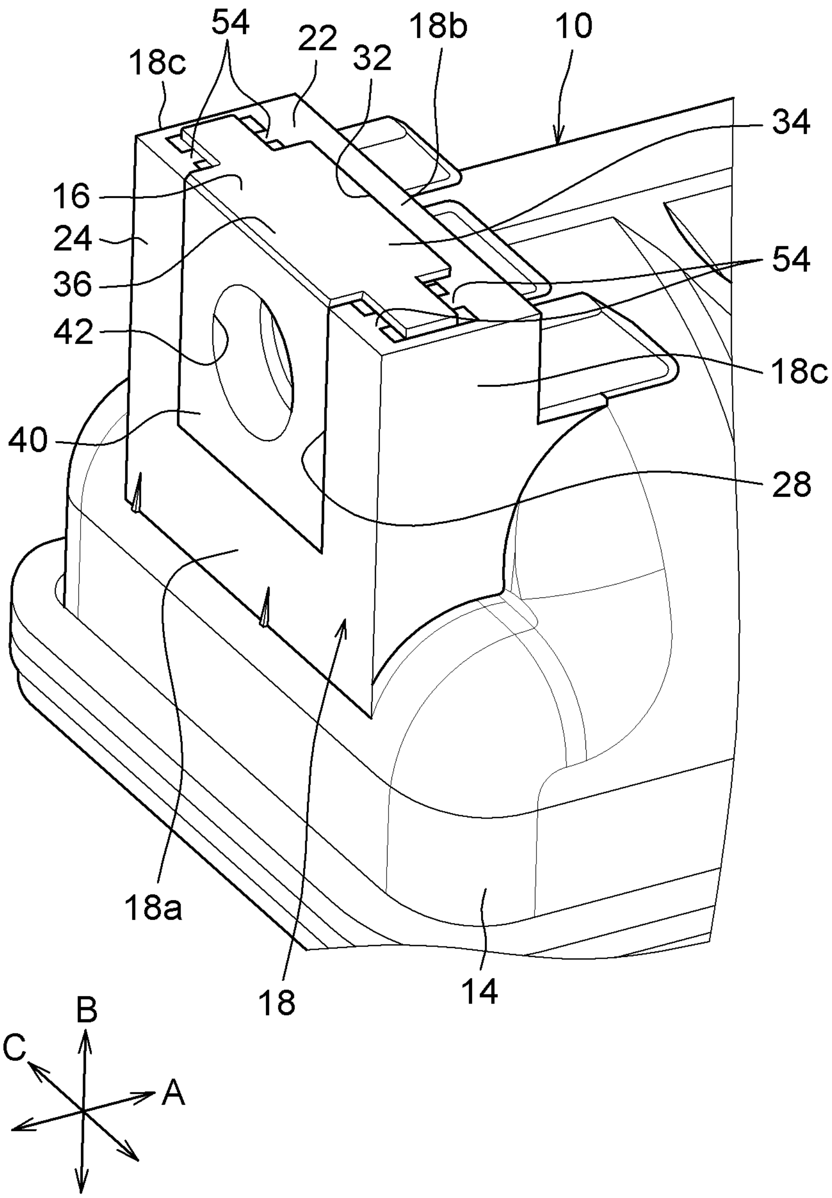
FIG. 5 is a perspective view of a radiator and a nut inserted into a holder according to a third embodiment.

Referring to FIG. 5, the radiator 10 and the structure for mounting the mounting bracket 12 to the radiator 10 according the third embodiment will be described. In the present embodiment, the guiding structure by the protrusion elements 38 and the groove elements 30 as described in the first embodiment is eliminated. Instead, the holder 18 according to the present embodiment includes two sets of holding elements 54 in the holding space 20.

The two set of holding elements 54 are positioned away from each other in the direction A and each of the holding elements 54 faces each other in the direction A (i.e., two holding elements 54 align with each other in the direction A). Each of the holding elements 54 protrudes inside of the holding space 20 and extends along the direction B. The two sets of the two holding elements 54 are arranged on both sides of the window 28.

By the existence of the two holding elements 54, the holding space 20 is partially narrowed in the direction A. With the structure, when the nut 16 is inserted into the holding space 20, the two side portions of the nut 16 (the main body 34) are held by the two sets of the holding elements 54. As a result, the nut 16 can be stably held in the holding space 20.

Other Embodiments

In the above-described embodiments, the end surface 40 of the nut 16 aligns with the flat outer surface 24 of the holder 18. However, the end surface 40 of the nut 16 may protrude from the flat outer surface 24 of the holder 18 through the window 28.

In the above-described embodiment, the mounting bracket 12 as an external component is mounted to the radiator 10 as a heat exchanger. However, the heat exchanger can be a condenser, a transmission oil cooler (TOC), a charge air cooler, or the like. For example, a mounting bracket as an external component can be mounted to a condenser as a heat exchanger through the structure according to the present disclosure.

In the above-described embodiment, the contact surface 46 has a flat surface. However, the contact surface 46 may have a curved surface.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

Example embodiments are provided so that this disclosure will be thorough, and will convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular example embodiments only and is not intended to be limiting. As used herein, the singular forms “a,” “an,” and “the” may be intended to include the plural forms as well, unless the context clearly indicates otherwise. The terms “comprises,” “comprising,” “including,” and “having,” are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed. As used herein, the term "and/or" includes any and all combinations of one or more of the associated listed items.

What is claimed is:

1. A heat exchanger, comprising:

a holder that defines a holding space therein; and a nut that includes a main body, which is inserted into the holding space along an insertion direction, and a protrusion, which protrudes from the main body, wherein the nut defines a threaded hole that extends through the main body and the protrusion, the holder further defines an opening at a first surface of the holder, the protrusion has an end surface that aligns with or protrudes from the first surface through the opening when the nut is inserted into the holding space, and the end surface contacts an external component when the external component is fixed to the heat exchanger by inserting a bolt into the threaded hole through the external component, wherein the holder further defines an attachment opening that is open at a second surface of the holder, the holder further includes a first guide extending along the insertion direction, the nut further includes a second guide extending along the insertion direction, and the first guide and the second guide are engaged with each other while guiding the nut relative to the holder in the insertion direction when the nut is inserted into the holding space through the attachment opening, the first guide is a guiding groove, the second guide is a guiding protrusion that protrudes from the main body, and the guiding protrusion is inserted into the guiding groove when the main body is inserted into the holding space.

2. The heat exchanger according to claim 1, wherein the guiding groove includes two groove elements that are arranged on both sides of the opening, and the guiding protrusion includes two protruding elements that are arranged on both side of the protrusion.

3. The heat exchanger according to claim 1, wherein the holder further defines an attachment opening that is at a second surface of the holder, the holder further includes a locking portion that is disposed on the second surface, and the locking portion is configured to be engageable with the nut when the nut is inserted into the holding space through the attachment opening.

4. The heat exchanger according to claim 3, wherein the locking portion is configured to be elastically deformable, the locking portion allows the nut to be inserted into the holding space through the attachment opening by being elastically deformed, and the locking portion engages with the nut by elastically returning to an original shape of the locking portion.

5. The heat exchanger according to claim 1, wherein the holder further includes two holding elements that protrude inside of the holding space, each of the two holding elements is arranged to be away from each other and to face each other, and the main body is held by the two holding elements when the nut is inserted into the holding space.

6. The heat exchanger according to claim 5, wherein two sets of the two holding elements are arranged on both sides of the opening.

7. The heat exchanger according to claim 1, wherein the nut is formed of metal, and the holder is formed of plastic.

8. A structure for mounting an external component to a heat exchanger, the structure comprising:

a holder that is disposed in the heat exchanger and defines a holding space therein;

a nut that includes a main body, which is inserted into the holding space along an insertion direction, and a protrusion, which protrudes from the main body;

a fixing portion that is disposed in the external component and defines a through hole; and a bolt, wherein the nut defines a threaded hole that extends through the main body and the protrusion, the holder further defines an opening that is open at a first surface of the holder, the protrusion has a first end surface that aligns with or protrudes from the first surface through the opening when the nut is inserted into the holding space, and the fixing portion has a second end surface that contacts the first end surface when the external component is fixed to the heat exchanger by inserting the bolt into the threaded hole through the through hole, wherein the holder further includes an attachment opening that is open at a second surface of the holder, wherein the holder further includes a first guide extending along the insertion direction, the nut further includes a second guide extending along the insertion direction, and the first guide and the second guide are engaged with each other while guiding the nut relative to the holder in the insertion direction when the nut is inserted into the holding space through the attachment opening, the first guide is a guiding groove, the second guide is a guiding protrusion that protrudes from the main body, and the guiding protrusion is inserted into the guiding groove when the main body is inserted into the holding space.

9. The structure according to claim 8, wherein the guiding groove includes two groove elements that are arranged on both sides of the opening, and the guiding protrusion includes two protruding elements that are arranged on both side of the protrusion.

10. The structure according to claim 8, wherein the holder further defines an attachment opening that is open at a second surface of the holder, the holder further includes a locking portion that is disposed on the second surface, and the locking portion is configured to be engageable with the nut when the nut is inserted into the holding space through the attachment opening.

11. The structure according to claim 10, wherein the locking portion is configured to be elastically deformable, the locking portion allows the nut to be inserted into the holding space through the attachment opening by being elastically deformed, and the locking portion engages with the nut by elastically returning to an original shape of the locking portion.

12. The structure according to claim 8, wherein the holder further includes two holding elements that protrude inside of the holding space, each of the two holding elements is arranged to be away from each other and to face each other, and the main body is held by the two holding elements when the nut is inserted into the holding space.

13. The structure according to claim 12, wherein two sets of the two holding elements are arranged on both sides of the opening.

14. The structure according to claim 8, wherein the nut is formed of metal, and the holder is formed of plastic.

* * * * *